Figure 1:
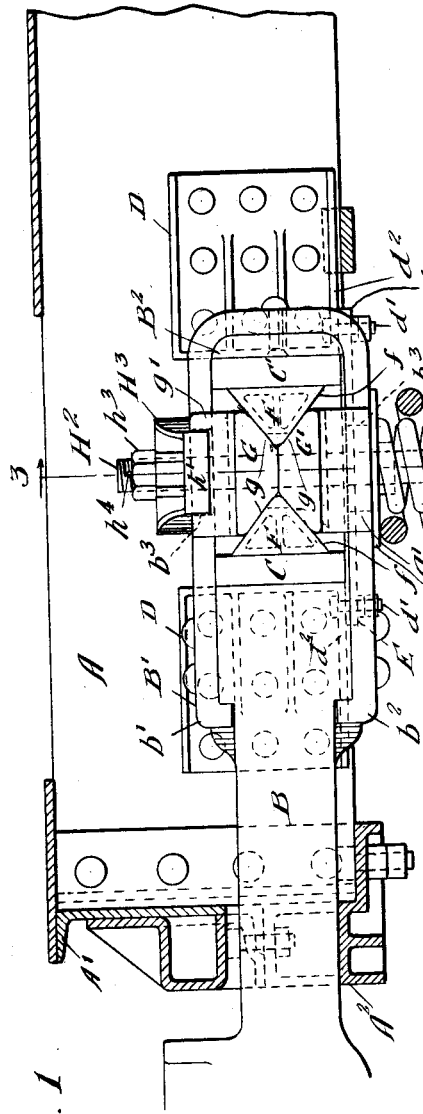

C. J. NASH.
FRICTION DRAFT RIGGING.
APPLICATION FILED APR. 26, 1909.

1,078,946.

Patented Nov. 18, 1913.
2 SHEETS—SHEET 1.

Witnesses:
Wm. Geiger

Inventor:
Charles J. Nash
By Munday, Evarts, Adcock & Clarke.
Attorneys

C. J. NASH.
FRICTION DRAFT RIGGING.
APPLICATION FILED APR. 26, 1909.
1,078,946.
Patented Nov. 18, 1913
2 SHEETS—SHEET 2.
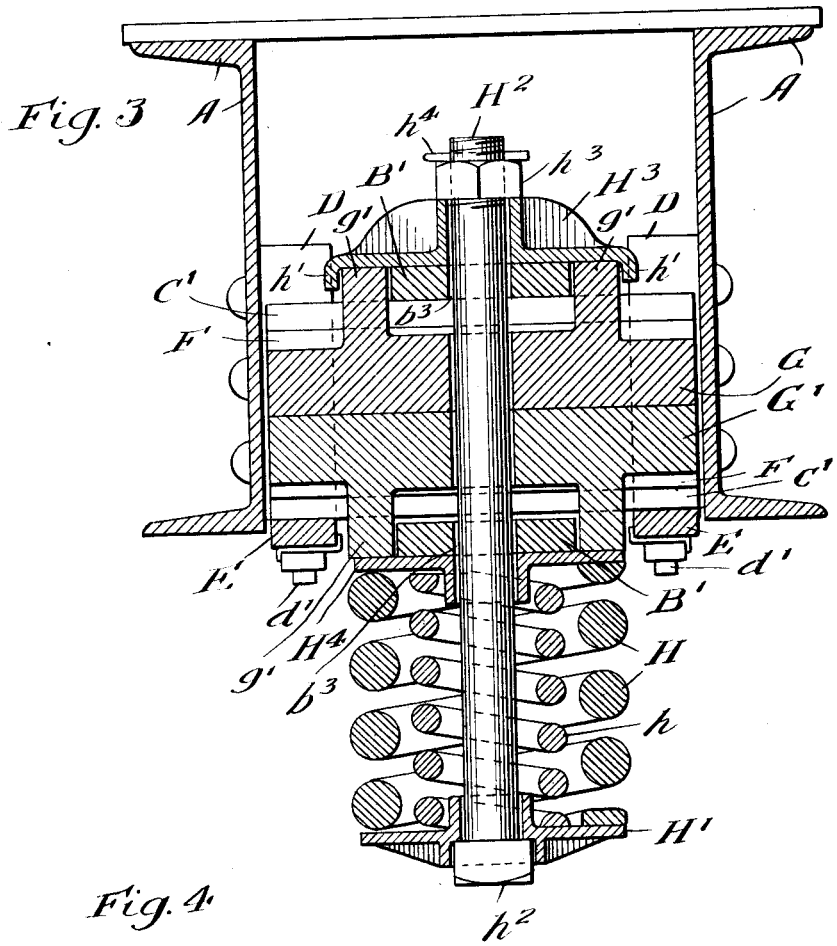
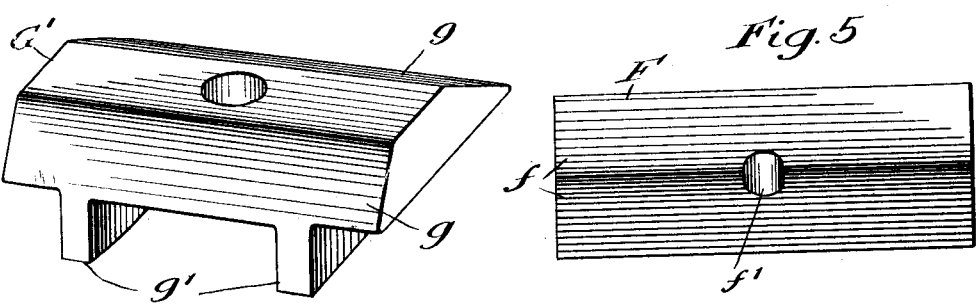

UNITED STATES PATENT OFFICE.

CHARLES J. NASH, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING.

1,078,946. Specification of Letters Patent. Patented Nov. 18, 1913.

Application filed April 26, 1909. Serial No. 492,184.

*To all whom it may concern:*

Be it known that I, CHARLES J. NASH, a citizen of the United States, residing in Chicago, in the county of Cook and State of Illinois, have invented a new and useful Improvement in Friction Draft-Rigging, of which the following is a specification.

My invention relates to improvements in friction draft rigging.

The object of my invention is to provide a friction draft rigging of a strong, simple, efficient and durable construction, which will be short and compact in form and occupy small space, which may be manufactured at small cost, and which at the same time will be readily accessible and capable of being easily and conveniently put in place and removed.

My invention consists in the means I employ to practically accomplish this object or result, as herein shown and described, and more particularly specified in the claims; the same comprising in connection with a draw-bar, draft yoke and draft members secured to the draft sills or frame members of the car, of a pair of followers extending through the draft yoke, one abutting directly against the draw-bar and the other against the rear end of the draft yoke, a pair of opposing friction wedges abutting one directly against the front follower and the other directly against the rear follower, and having inclined friction faces, upper and lower friction blocks having inclined friction faces engaging the friction faces of the wedges, removable guide bars or plates secured to the draft members and supporting the draft rigging, the lower friction block having on its under face depending ribs fitting astride the lower member of the draft yoke and between the guide bars or plates which support the draft rigging, and the upper friction block having upwardly projecting ribs fitting astride the upper member of the draft yoke, a vertically arranged spring bearing at one end against one of the friction blocks, and a connecting rod for the spring having a spring seat or bearing plate at one end against which the outer end of the spring bears, said connecting rod extending centrally through the springs, draft yoke and the friction blocks, and provided with a cap at one end engaging one of the friction blocks, the friction blocks moving to and from each other under the tension of the spring, and the friction blocks and spring also moving longitudinally. The holes or openings in the draft yoke through which the connecting rod extends are longitudinal slots, as the spring, upper and lower friction blocks and connecting rod while moving longitudinally have a less amount of longitudinal movement than the draw-bar and yoke, the same being approximately one half. The connecting rod, in connection with the upper and lower friction blocks, having round holes through which the connecting rod extends, serves also as a pivot upon which the draw-bar may swing laterally from side to side, when the train is rounding curves. The upwardly and downwardly projecting guide ribs on the upper and lower friction blocks are preferably furnished with slightly curved faces for clearing the draft yoke to enable the draw-bar and draft yoke to swing laterally without binding. The upright spring, which holds the upper and lower friction blocks under tension is preferably, as illustrated in the drawing, arranged below the lower friction block, as ordinarily this construction is more convenient than the reverse one where the spring is above the upper friction block.

My invention also consists in the novel construction of parts and devices and in the novel combinations of parts and devices herein shown and described, and more particularly specified in the claims.

Figure 2:
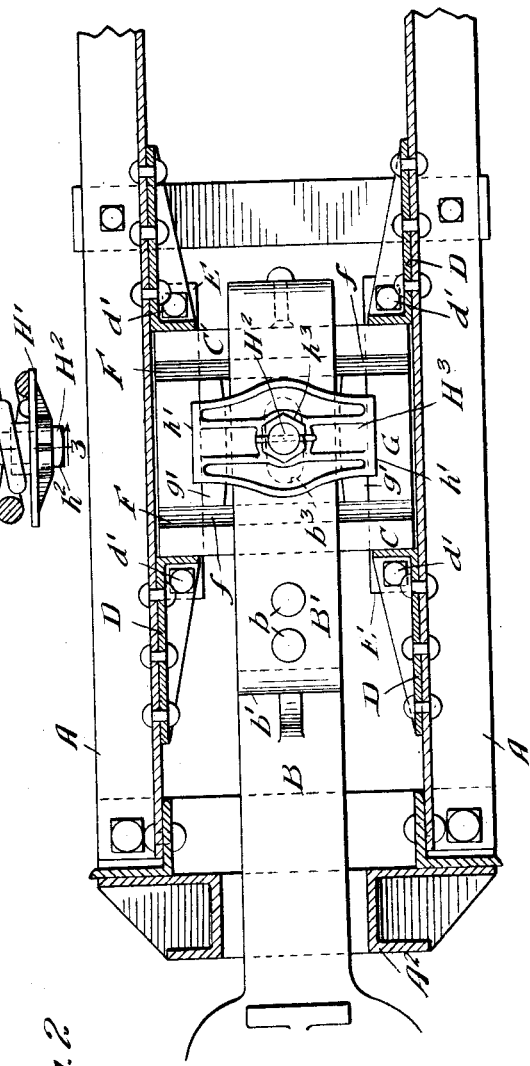

In the accompanying drawing forming a part of this specification, Figure 1 is a side elevation partly in longitudinal section of a friction draft rigging embodying my invention. Fig. 2 is a plan view, partly in horizontal section. Fig. 3 is a vertical cross section on line 3—3 of Fig. 1. Fig. 4 is a detail perspective view of one of the friction blocks, the friction blocks being preferably duplicates of each other and Fig. 5 is a face view of one of the friction wedges.

In the drawing, A represents the center or draft sills of a car to which the draft rigging is applied, $A^1$ the front sill and $A^2$ the carry-iron.

B is the coupler draw-bar, $B^1$ the draft yoke secured to the draw-bar in any suitable manner, as by rivets $b$ and interengaging lugs or shoulders $b^1$ $b^2$.

C $C^1$ are front and rear followers and D the draft members secured to the draft sills A and against which the followers abut. The front follower contacts directly with the rear end of the draw-bar and the rear follower contacts directly against the rear end of the draft yoke $B^1$ or the filler block $B^2$ therein if one is employed.

F F are oppositely facing friction wedges, the front one in direct contact with the front follower C and the rear one in direct contact with the rear follower, the same extending transversely through the yoke.

G and $G^1$ are upper and lower friction blocks extending through the draft yoke $B^1$, and each having inclines or wedging faces $g\ g$ engaging the corresponding inclines or wedging faces $f\ f$ of the friction wedges F F. The friction wedges F F are preferably duplicates of each other, and the friction blocks G $G^1$ are also preferably duplicates of each other. Each of the friction blocks G has on its outer face a pair of parallel guide ribs $g^1\ g^1$, those on the lower friction block $G^1$ fitting astride the lower member of the draft yoke $B^1$ and between the removable guide bars or plates E E which support the draft rigging, and which are removably secured to the draft members D by short bolts $d^1$ extending through the lower flanges $d^2$ of the draft members D and upon which guide bars or plates the followers directly rest. The parallel guide ribs $g^1$ on the upper face of the upper friction block G fit astride the upper member of the draft yoke $B^1$.

H, $h$ are upright springs, preferably arranged below and acting at their upper ends against the lower friction block $G^1$ and bearing at their lower ends against the spring seat or bearing plate $H^1$ at the lower end of the connecting rod $H^2$ which extends up centrally through the springs through longitudinal slots $b^3$ in the upper and lower members of the draft yoke, through holes $g^2$ in the upper and lower friction blocks G $G^1$ and between the friction wedges F F, and also through a cap or top plate $H^3$ which rests upon and bears against the upper friction block G. The cap $H^3$ is preferably furnished with depending flanges $h^1$ embracing the parallel ribs $g^1$ on the upper face of the upper friction block $G^1$. The central connecting bolt $H^2$ is furnished with a head $h^2$ at one end, preferably its lower end, and with a threaded nut $h^3$ at its upper end and a key $h^4$ for locking the nut from turning. A spring seat or bearing plate $H^4$ is interposed between the upper end of the springs H, $h$, and the lower friction block $G^1$. The friction wedges F are each furnished at their meeting ends or edges with a recess or slot $f^1$ to accommodate or clear the central connecting bolt $H^2$, which has only about half the longitudinal movement of the wedges F F.

The upright inner faces of the guide ribs $g^1$ on the friction blocks G $G^1$ which span the upper and lower limbs of the draft yoke are preferably slightly rounded or curved to enable the draft yoke to properly clear these guide ribs when the draw-bar swings laterally from side to side about the connecting rod $H^2$ as a pivot.

The followers are preferably made of wrought iron, and the friction blocks of hard, white cast iron and the friction wedges, in order to produce an efficient frictional action with the friction blocks, are preferably made of soft, malleable iron, this construction producing a large amount of frictional resistance. A material advantage is thus secured in making the friction wedges in separate pieces from the followers against which they abut.

The outer faces of the guide ribs $g^1$ on the upper and lower friction blocks are flush with the outer faces of the draft yoke when the draft rigging releases and the spring expands to normal or uncompressed position, and the upper and lower members of the draft yoke by their coöperating action with the guide ribs $g^1$ and the inner spring seat $H^1$ and cap $H^3$ thus cause the loose friction wedges F F to be restored to central and proper position between the upper and lower members of the draft yoke. The draft yoke, and plates $H^1$ $H^3$ adjacent to the draft yoke, the spring and friction blocks G $G^1$ and the guide ribs $g^1$ thereon thus coöperate in releasing to maintain the friction wedges F F always in central position.

I claim:—

1. In a friction draft rigging, the combination with a draw-bar, draft yoke, draft members and front and rear followers contacting with the draw-bar and draft yoke, a pair of longitudinally movable oppositely faced friction wedges contacting with the followers and extending transversely through the draft yoke, upper and lower friction blocks extending transversely through the draft yoke and having inclined friction faces in frictional engagement with the inclined friction faces of said wedges, an upright spring acting at its inner end against one of said friction blocks, and a central connecting rod having a spring seat at one end and extending through the friction blocks and the draft yoke, and a cap plate interposed between the other end of said connecting rod and one of the friction blocks, substantially as specified.

2. In a friction draft rigging, the combination with a draw-bar, draft yoke, draft members and front and rear followers, contacting with the draw-bar and draft yoke, a pair of longitudinally movable oppositely faced friction wedges contacting with the followers and extending transversely through the draft yoke, upper and lower friction blocks extending transversely through the draft yoke and having inclined friction faces in frictional engagement with the inclined friction faces of said wedges, an upright spring acting at its inner end against one of the friction blocks, and a central connecting rod having a spring seat at its outer end and extending through the friction blocks, the spring and the draft yoke, and removable guide bars or plates secured to the draft members and supporting the followers, and a cap plate interposed between the upper end of said connecting rod and the upper friction block, substantially as specified.

3. In a friction draft rigging, the combination with a draw-bar, draft yoke, draft members and front and rear followers contacting with the draw-bar and draft yoke, a pair of longitudinally movable oppositely faced friction wedges contacting with the followers and extending transversely through the draft yoke, upper and lower friction blocks extending transversely through the draft yoke and having inclined friction faces in frictional engagement with the inclined friction faces of said wedges, an upright spring acting at its inner end against one of the friction blocks, and a central connecting rod having a spring seat at its outer end and extending through the friction blocks and the draft yoke and separately formed from the said blocks, said upper and lower friction blocks having on their outer faces parallel ribs fitting astride the upper and lower members of the draft yoke, each of said upper and lower friction blocks being removable from the yoke without disconnecting the yoke and draw-bar, and a cap plate interposed between the upper end of said connecting rod and the upper friction block, substantially as specified.

4. In a friction draft rigging, the combination with a draw-bar, draft yoke and followers, of oppositely facing friction wedges extending through the draft yoke, and upper and lower friction blocks frictionally engaging said wedges, and an upright spring acting against one of the friction blocks and a connecting rod for the spring extending through the yoke, and a cap plate interposed between the upper end of said connecting rod and the upper friction block, substantially as specified.

5. In a friction draft rigging, the combination with a draw-bar, draft yoke and followers, of oppositely facing friction wedges extending through the draft yoke, and upper and lower friction blocks frictionally engaging said wedges, and an upright spring acting against one of the friction blocks and a connecting rod for the spring extending through the yoke and the friction blocks, and a spring seat plate at the outer end of said connecting rod, said yoke having longitudinal slots to receive said rod, and a cap plate interposed between the upper end of said connecting rod and the upper friction block, substantially as specified.

6. In a friction draft rigging, the combination with a draw-bar, draft yoke and followers, of oppositely facing friction wedges extending through the draft yoke, and upper and lower friction blocks frictionally engaging said wedges, and an upright spring acting against one of the friction blocks and a connecting rod for the spring extending through the yoke, a bearing plate outside the yoke and interposed between the upper end of said connecting rod and said upper friction block, said connecting rod serving as a pivot for the draw-bar and draft yoke to swing laterally upon in rounding curves, substantially as specified.

7. In a friction draft rigging, the combination with a draw-bar, draft yoke and followers, of oppositely facing friction wedges extending through the draft yoke, and upper and lower friction blocks frictionally engaging said wedges, and an upright spring acting against one of the friction blocks and a connecting rod for the spring extending through the yoke, said connecting rod serving as a pivot for the draw-bar and draft yoke to swing laterally upon in rounding curves, said upper and lower friction blocks having guide ribs fitting astride the upper and lower members of the draft yoke and provided with curved inner edges to permit the draw bar and draft yoke to swing laterally without binding, substantially as specified.

CHARLES J. NASH.

Witnesses:
EDMUND ADCOCK,
WILLIAM A. GEIGER.

---

Copies of this patent may be obtained for five cents each, by addressing the "Commissioner of Patents, Washington, D. C."